United States Patent
Chen et al.

(10) Patent No.: US 12,493,177 B2
(45) Date of Patent: Dec. 9, 2025

(54) OPTICAL ELEMENT DRIVING MECHANISM

(71) Applicant: TDK TAIWAN CORP., Taoyuan (TW)

(72) Inventors: Yung-Yun Chen, Taoyuan (TW);
Yu-Chi Kuo, Taoyuan (TW);
Xuan-Huan Su, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 395 days.

(21) Appl. No.: 18/173,340

(22) Filed: Feb. 23, 2023

(65) Prior Publication Data

US 2023/0266579 A1    Aug. 24, 2023

Related U.S. Application Data

(60) Provisional application No. 63/312,987, filed on Feb. 23, 2022.

(51) Int. Cl.
*G02B 26/02*    (2006.01)
*G03B 9/06*    (2021.01)
*H02K 41/035*    (2006.01)

(52) U.S. Cl.
CPC ............... *G02B 26/02* (2013.01); *G03B 9/06* (2013.01); *H02K 41/0354* (2013.01)

(58) Field of Classification Search
CPC ....... G02B 26/02; G03B 9/06; H02K 41/0354
USPC ........................................................... 359/601
See application file for complete search history.

(56) References Cited

U.S. PATENT DOCUMENTS

| | | | |
|---|---|---|---|
| 12,098,812 B1 * | 9/2024 | Li ............................ | F21V 14/06 |
| 2020/0301246 A1 * | 9/2020 | Seo ......................... | H04N 23/55 |
| 2021/0278624 A1 * | 9/2021 | Wang .................... | G02B 27/646 |
| 2021/0364434 A1 * | 11/2021 | Wu ......................... | G01N 21/954 |
| 2023/0266579 A1 * | 8/2023 | Chen ........................ | G03B 5/00 |
| | | | 359/601 |
| 2024/0111155 A1 * | 4/2024 | Hu ...................... | H05K 7/20963 |
| 2024/0214680 A1 * | 6/2024 | Hu ............................ | G03B 5/02 |
| 2024/0280880 A1 * | 8/2024 | Deng ..................... | H04N 23/00 |
| 2025/0116844 A1 * | 4/2025 | Shen .................... | G02B 7/1805 |

* cited by examiner

*Primary Examiner* — Allyson N Trail
(74) *Attorney, Agent, or Firm* — MUNCY, GEISSLER, OLDS & LOWE, P.C.

(57) ABSTRACT

An optical element driving mechanism, which drives an optical element, includes a fixed portion, a first movable portion, and a driving assembly. The first movable portion is moved relative to the fixed portion, and the driving assembly drives the first movable portion to move relative to the fixed portion. The first movable portion is moved in a first dimension relative to the fixed portion, and the first movable portion drives the optical element to move.

19 Claims, 15 Drawing Sheets

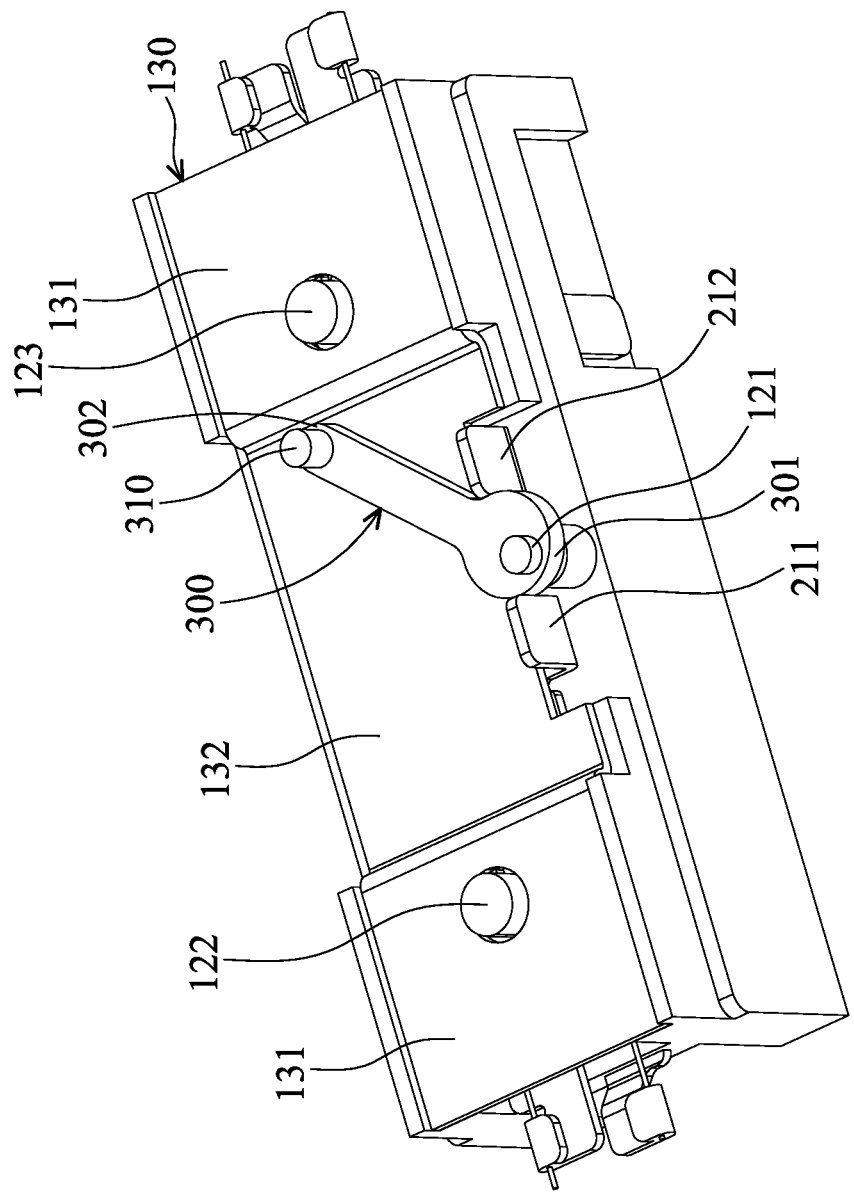
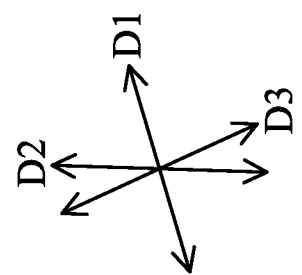
FIG. 4

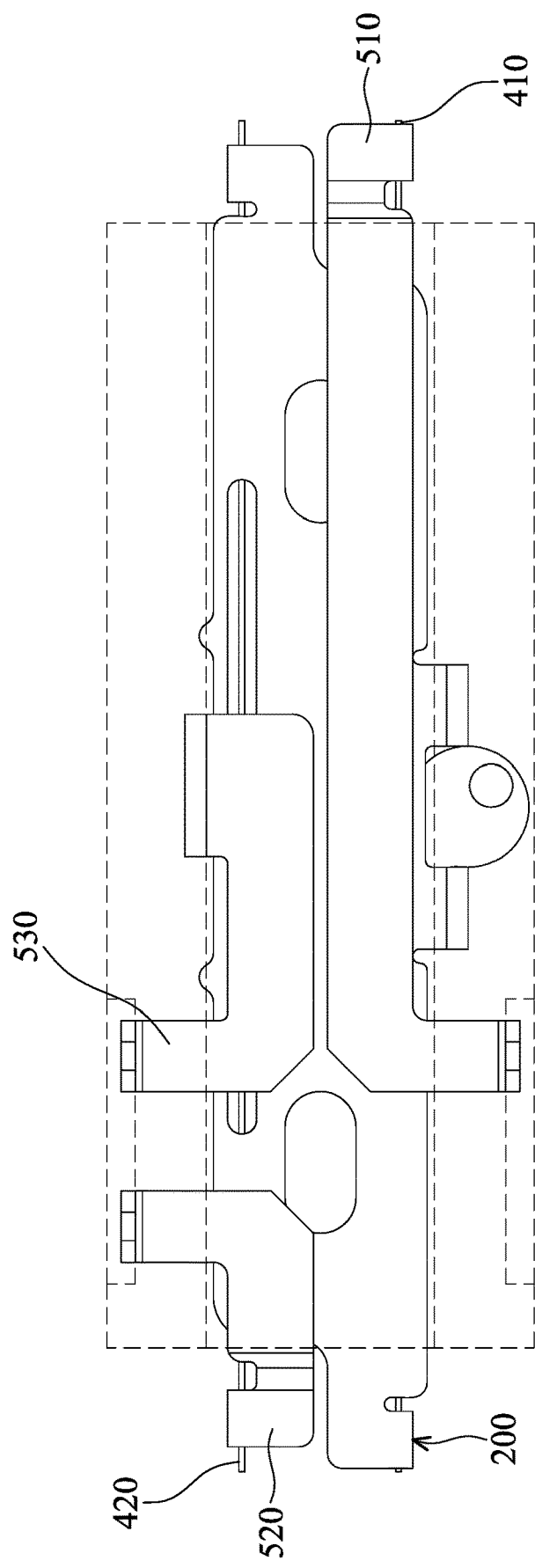
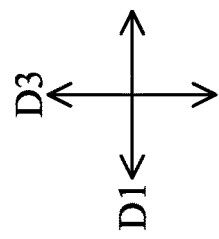
FIG. 8

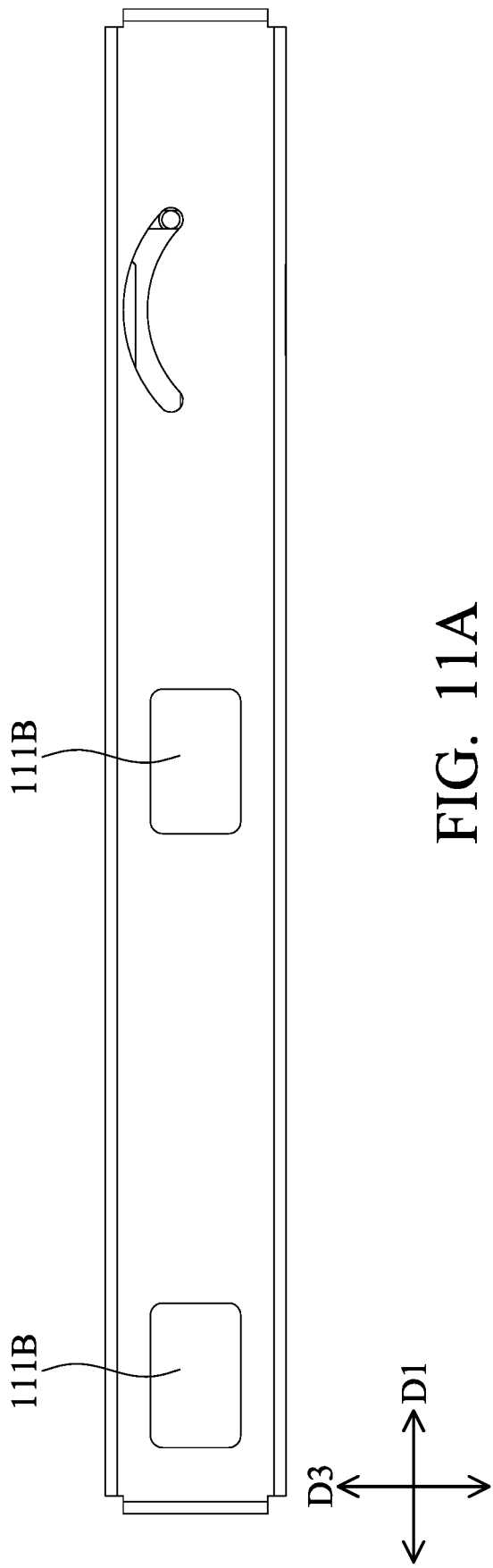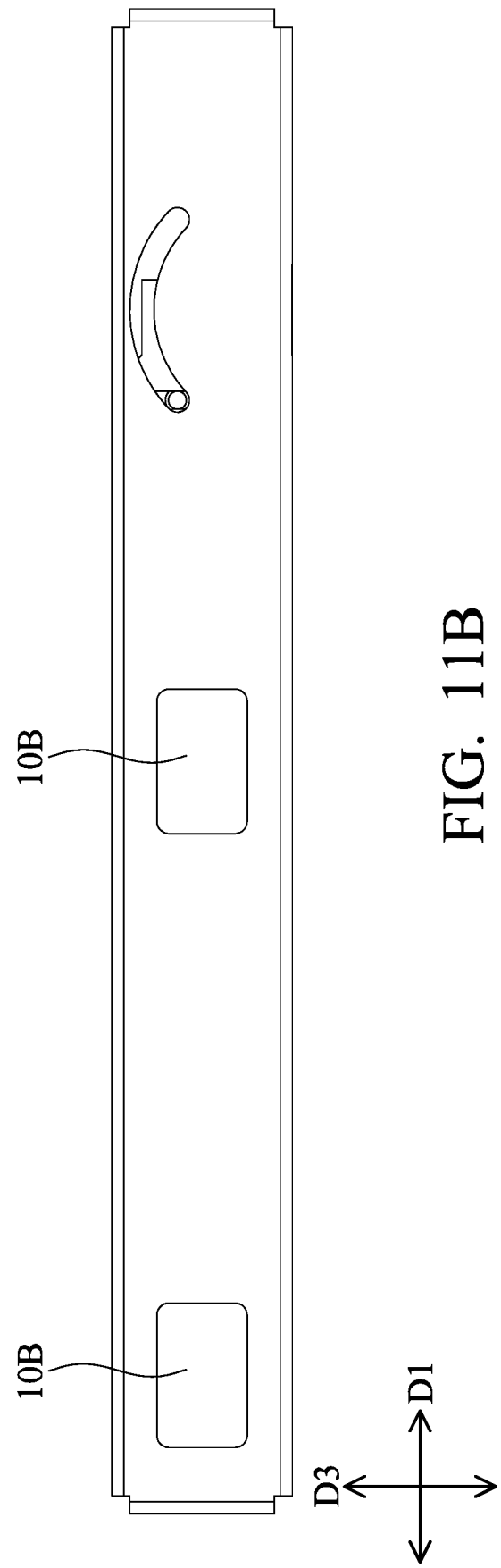

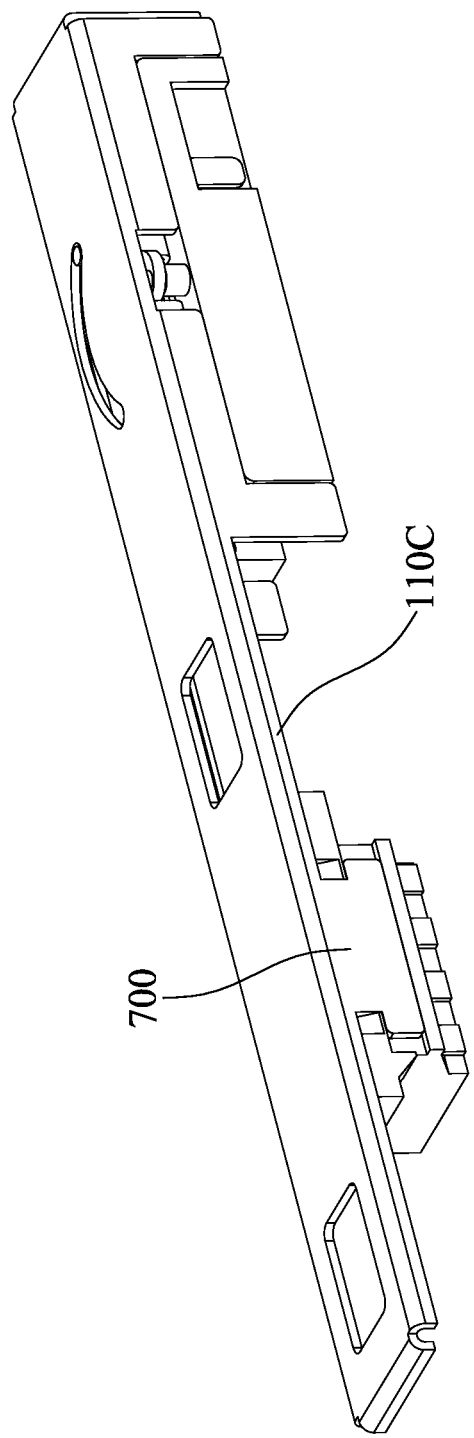
FIG. 12A
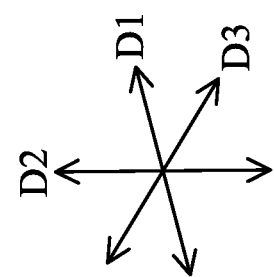

OPTICAL ELEMENT DRIVING MECHANISM

CROSS REFERENCE TO RELATED APPLICATIONS

The present application claims priority to U.S. Provisional Patent Application No. 63/312,987, filed Feb. 23, 2022, which are incorporated by reference herein in their entirety.

BACKGROUND OF THE INVENTION

Field of the Invention

The present invention relates to a driving mechanism, and more particularly to an optical element driving mechanism.

Description of the Related Art

With the development of technology, many electronic devices (such as computers) now have the function of taking pictures or videos. However, when an optical element (such as a shutter) for controlling the amount of light needs to be provided in an electronic device, it will cause an increase in the thickness of the electronic device, which is not conducive to reducing the thickness of the electronic device. In addition, the conventional optical element driving mechanism also has the problem of being susceptible to magnetic interference. In view of this, how to design an optical element driving mechanism that can make the electronic device thinner, and is less susceptible to magnetic interference and can control the amount of light has become an important issue.

BRIEF SUMMARY OF THE INVENTION

An embodiment of the invention provides an optical element driving mechanism, which drives an optical element, includes a fixed portion, a first movable portion, and a driving assembly. The first movable portion is moved relative to the fixed portion, and the driving assembly drives the first movable portion to move relative to the fixed portion. The first movable portion is moved in a first dimension relative to the fixed portion, and the first movable portion drives the optical element to move.

According to some embodiments of the present disclosure, the optical element driving mechanism further includes a second movable portion, movable relative to the fixed portion and the first movable portion; wherein: a motion in the first dimension includes a movement along a first direction; the second movable portion is moved in a second dimension relative to the fixed portion; the second dimension is different from the first dimension; the fixed portion includes a base, and the base has a rotating shaft extending along a second direction, and the first direction is perpendicular to the second direction; a motion in the second dimension includes a rotation around the rotating shaft; when viewed along the second direction, the fixed portion is a rectangle, and a long side of the rectangle extends along the first direction, and a short side of the rectangle extends along a third direction that is perpendicular to the first direction and the second direction; the first movable portion drives the second movable portion to move.

According to some embodiments of the present disclosure, wherein: the rotating shaft does not pass through a center of the rectangle; the fixed portion has an opening corresponding to an optical module; the opening and the second movable portion are arranged along the first direction.

According to some embodiments of the present disclosure, wherein: the first movable portion is a plate-shaped structure, and the plate-shaped structure is perpendicular to the second direction; the first movable portion further has a first linkage portion, and the first linkage portion has two engaging structures, and the two engaging structures protrude from the plate-shaped structure toward the optical element along the second direction; the first movable portion drives the second movable portion to move via the first linkage portion; the second movable portion is disposed between the two engaging structures of the first linkage portion.

According to some embodiments of the present disclosure, wherein: the second movable portion has a first end portion and a second end portion, the first end portion is provided with a hole through which the rotating shaft passes, the second end portion is provided with a second linkage portion, and the second linkage portion is a cylindrical structure extending along the second direction; the optical element has an accommodating portion, which accommodates the second linkage portion; the second movable portion drives the optical element to move through the second linkage portion.

According to some embodiments of the present disclosure, wherein when viewed along the second direction, the rotating shaft is disposed closer to one of the two engaging structures.

According to some embodiments of the present disclosure, wherein: when viewed along the second direction, the first linkage portion and the second linkage portion are respectively located on both sides of the center; when viewed along the second direction, the rotating shaft and the second linkage portion are respectively located on two sides of the center of the rectangle.

According to some embodiments of the present disclosure, wherein: the second movable portion drives the optical element to move in a third dimension; the third dimension is different from the second dimension; a motion in the third dimension includes a movement along a first direction.

According to some embodiments of the present disclosure, wherein: the fixed portion further includes a spacer element disposed between the optical element and the driving assembly; the spacing element is a plate-shaped structure, the plate-shaped structure has a flat portion and a recessed portion, and the recessed portion is recessed from the flat portion away from the optical element along the second direction; the spacer element is configured to support the optical element; the optical element is disposed on the flat portion; the spacer element guides a motion of the optical element; the recessed portion accommodates the second movable portion.

According to some embodiments of the present disclosure, wherein: the spacer element is fixedly connected to the base of the fixed portion via an adhesive element, and the adhesive element is adjacent to the recessed portion; the recessed portion and the opening are arranged along the first direction.

According to some embodiments of the present disclosure, wherein: the fixed portion further includes a first positioning structure and a second positioning structure, disposed on the base and extending from the base to the optical element along the second direction, and the first positioning structure and the second positioning structure are arranged along the first direction; the first positioning structure and the second positioning structure position the spacing element; the first positioning structure and the second positioning structure guide a motion of the first movable portion; the first movable portion has a first hole and a second hole, and the first positioning structure and the second positioning structure respectively pass through the first hole and the second hole; a length of any one of the first hole and the second hole along the first direction is greater than a length along the third direction; the first positioning structure guides the movement of the optical element; the optical element further has a hole portion, and the first positioning structure passes through the hole portion.

According to some embodiments of the present disclosure, wherein: the driving assembly includes a first driving element and a second driving element; the first driving element is an elongated structure extending along the first direction; the second driving element is an elongated structure parallel to the first driving element and extending along the first direction; the first driving element and the second driving element includes a shape memory alloy; the first driving element has a first electrical contact and a second electrical contact; the first electrical contact is fixedly connected to the fixed portion; the second electrical contact is fixedly connected to the first movable portion; the second driving element has a third electrical contact and a fourth electrical contact; the third electrical contact is fixedly connected to the fixed portion; the fourth electrical contact is fixedly connected to the first movable portion; when viewed along the second direction, the first electrical contact and the fourth electrical contact are located on the same side of the fixed portion; when viewed along the second direction, the first electrical contact and the third electrical contact are respectively located on different two sides of the fixed portion.

According to some embodiments of the present disclosure, wherein: the driving assembly is electrically connected to an external circuit via the first movable portion; the first driving element is electrically connected to the second driving element via the first movable portion; the first movable portion includes a metal material.

According to some embodiments of the present disclosure, wherein: a first circuit component, a second circuit component, and a third circuit component are embedded in the base; one end of the first circuit component is connected to the external circuit, and the other end is connected to the first electrical contact; one end of the second circuit component is connected to the external circuit, and the other end is connected to the third electrical contact; one end of the third circuit component is grounded, and the other end is an electrical end portion exposed from the base, and the electrical end portion is disposed on an inner sidewall of the base, and the inner sidewall is perpendicular to the third direction.

According to some embodiments of the present disclosure, wherein: the first movable portion further has a plurality of protruding portions protruding along the third direction, and the plurality of protruding portions are arranged along the first direction; one of the plurality of protruding portions is in contact with the electrical end portion of the third circuit component.

According to some embodiments of the present disclosure, wherein the inner wall is provided with a plurality of protruding structures, and a plurality of concave structures formed between the plurality of protruding structures accommodate the plurality of protruding portions respectively.

According to some embodiments of the present disclosure, wherein: the first movable portion further has at least one hollowed portion, and the at least one hollowed portion is disposed adjacent to the plurality of protruding portions; the second movable portion includes a plastic material.

According to some embodiments of the present disclosure, the optical element driving mechanism further includes a fixing assembly, which keeps the first movable portion fixed when the driving assembly is not in motion; wherein: the fixing assembly includes a first fixing element and a second fixing element, which are respectively disposed on the first movable portion and the fixed portion; the fixing assembly further includes an elastic portion, which is flexible and connected to the first fixing element or the second fixing element; the first fixing element has a protruding structure; the second fixing element has a concave structure; the first fixing element includes a metal material; the first fixing element is integrally formed with the first movable portion; the first fixing element is connected to the first movable portion via the elastic portion; the second fixing element includes a plastic material.

According to some embodiments of the present disclosure, the optical element driving mechanism further includes a position sensing assembly including a reference element disposed on the optical element and a position sensing element disposed and connected to the fixed portion, wherein when viewed along the second direction, the position sensing element does not overlap with the base.

According to some embodiments of the present disclosure, wherein the fixed portion further has more than one opening corresponding to more than one optical module respectively.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 4 is a schematic diagram showing a partial structure of an optical element driving mechanism according to an embodiment of the present disclosure.

FIG. 8 is a bottom view showing a partial structure of an optical element driving mechanism according to an embodiment of the present disclosure.

FIG. 11A and FIG. 11B are top views showing different operations of the optical element driving mechanism according to another embodiment of the present disclosure.

FIG. 12A is a perspective view showing an optical element driving mechanism according to another embodiment of the present disclosure.

DETAILED DESCRIPTION OF THE INVENTION

Figure 1:
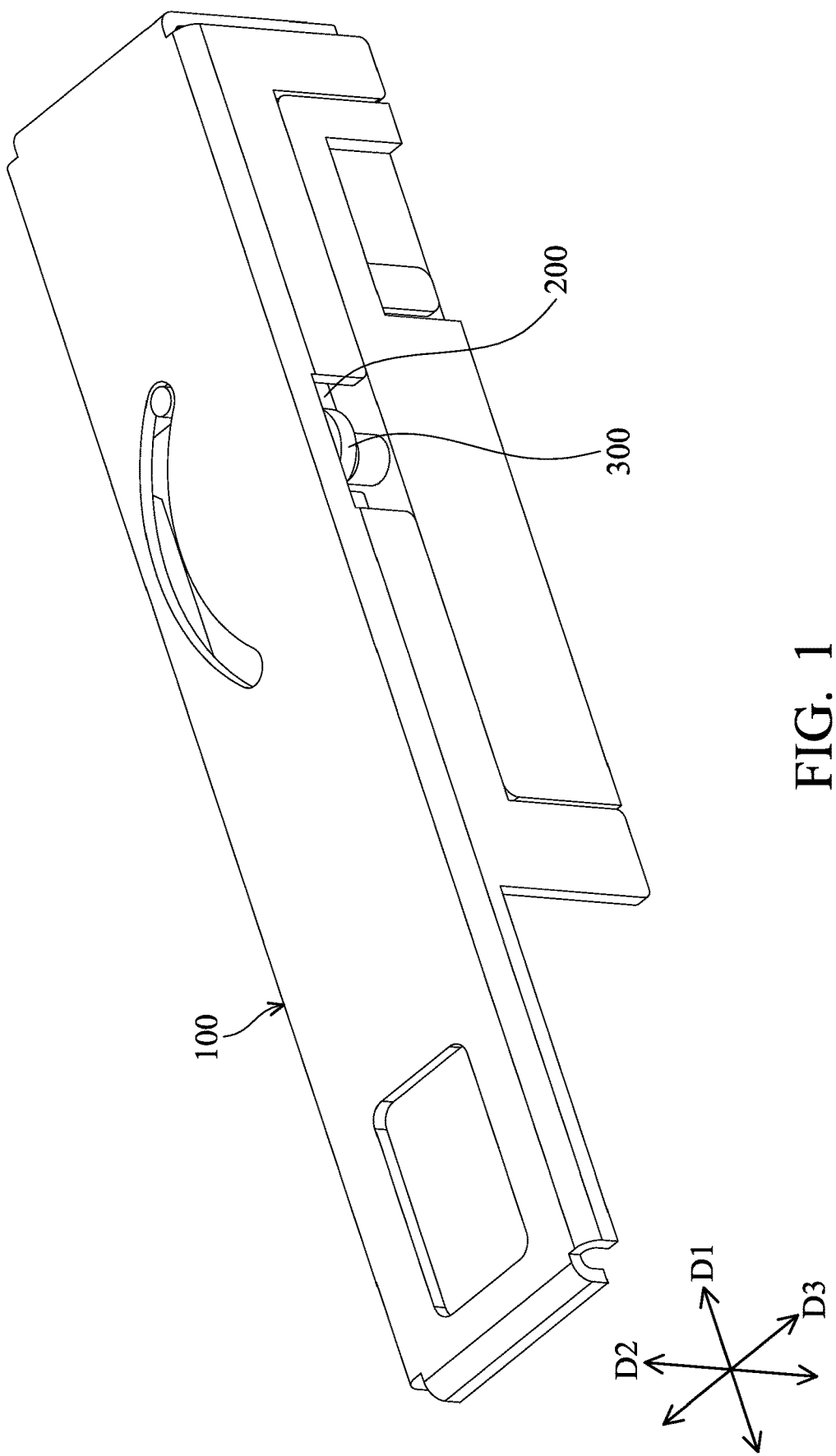
FIG. 1 is a perspective view showing an optical element driving mechanism according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that when an element is referred to as being "connected to" or "coupled to" another element, the element may be directly connected or coupled to another element, or there are one or more elements between the two elements. In addition, the use of ordinal numbers such as first, second, and third does not necessarily imply a sense of order, but can be multiple instances to distinguish actions or structures.

Reference to "one embodiment" or "an embodiment" throughout the specification means that particular features, structures, or characteristics described in conjunction with the embodiment are included in at least one embodiment. Therefore, the sentences "in one embodiment" or "in an embodiment" appearing in various places throughout the specification do not necessarily all refer to the same embodiment. In addition, in one or more embodiments, specific features, structures, or characteristics may be combined in any suitable manner.

Figure 2:
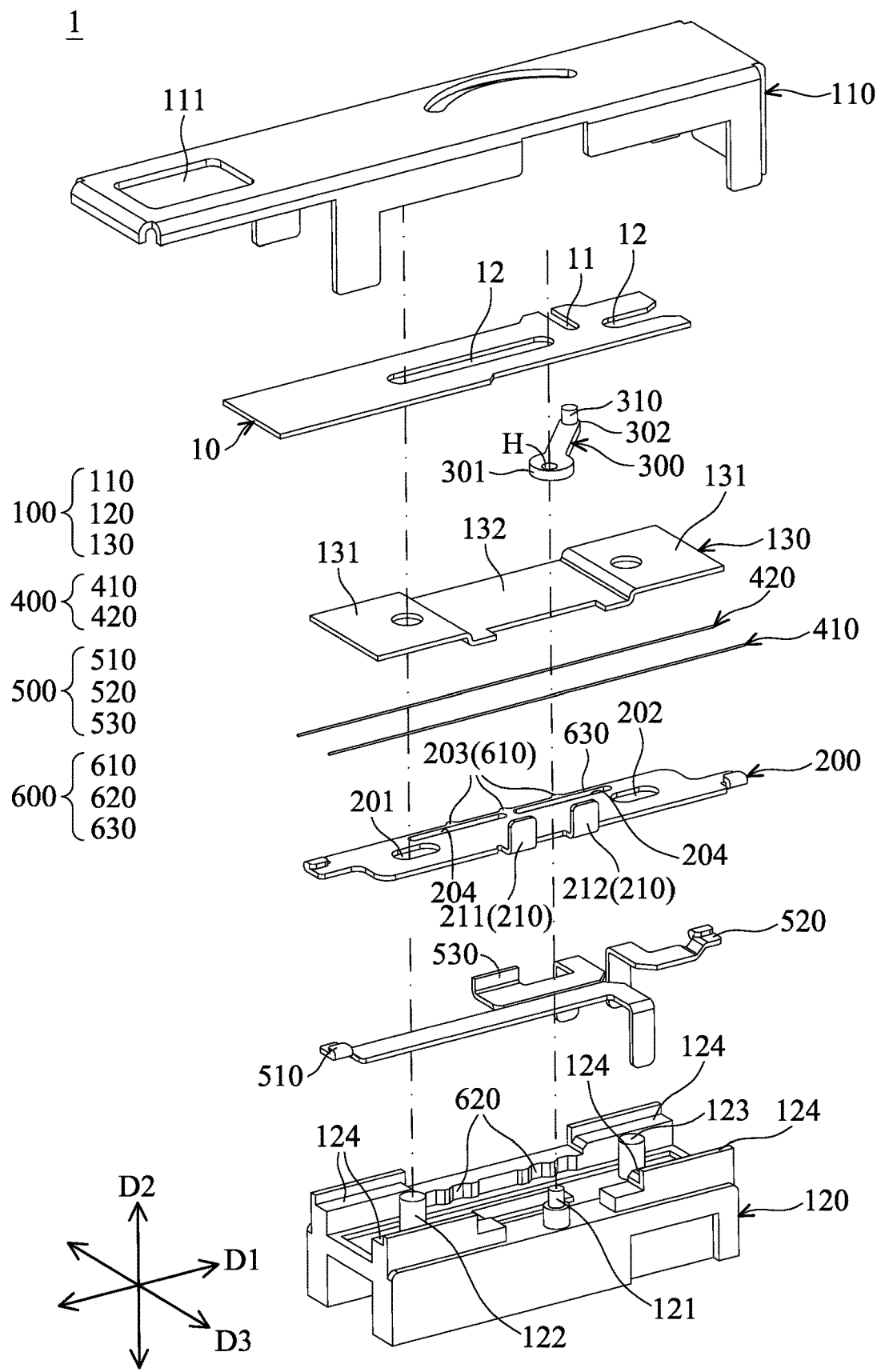
FIG. 2 is an exploded view showing an optical element driving mechanism according to an embodiment of the present disclosure.
Figure 3:
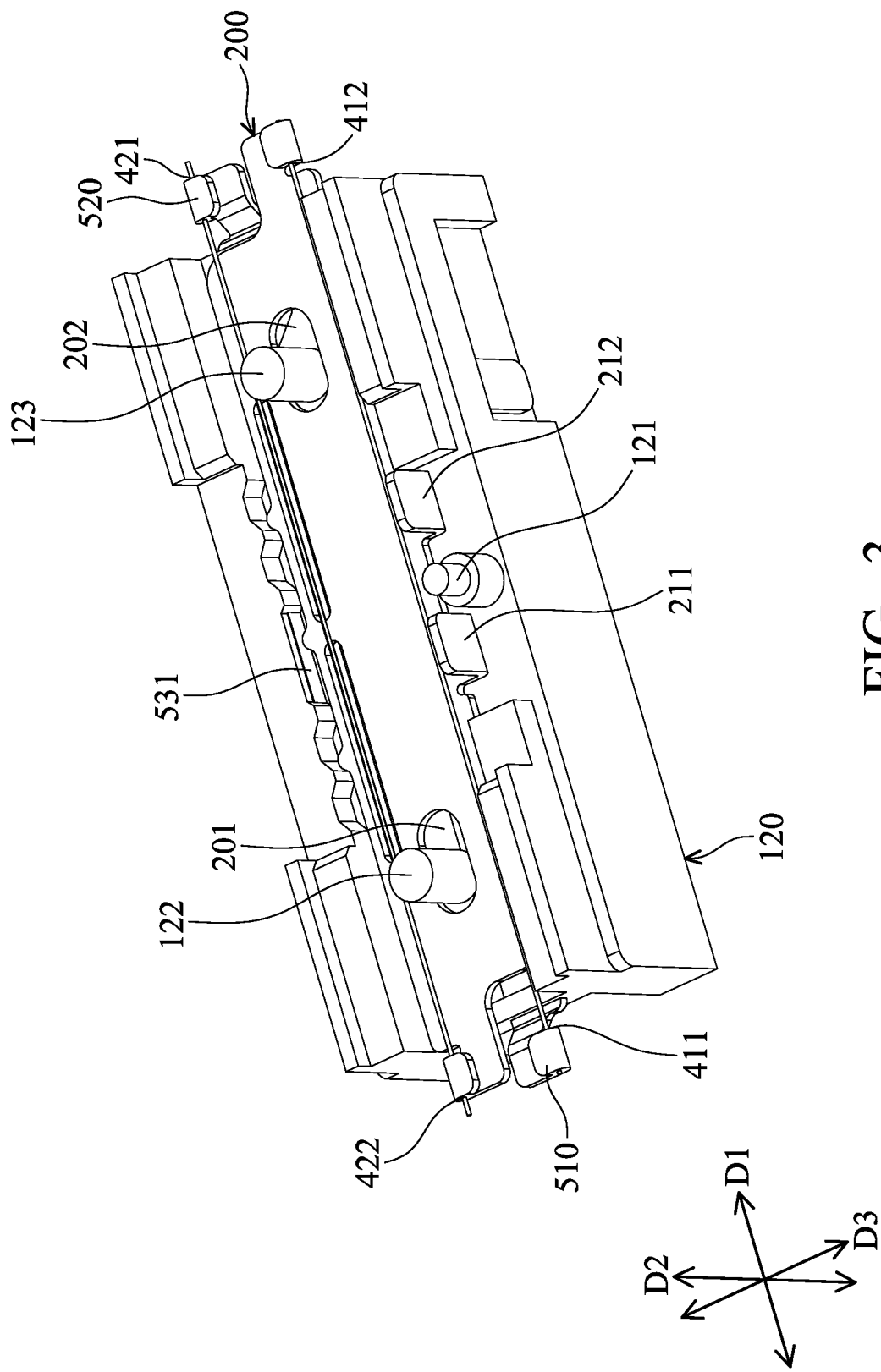
FIG. 3 is a perspective view showing a partial structure of an optical element driving mechanism according to an embodiment of the present disclosure.
Figure 5:
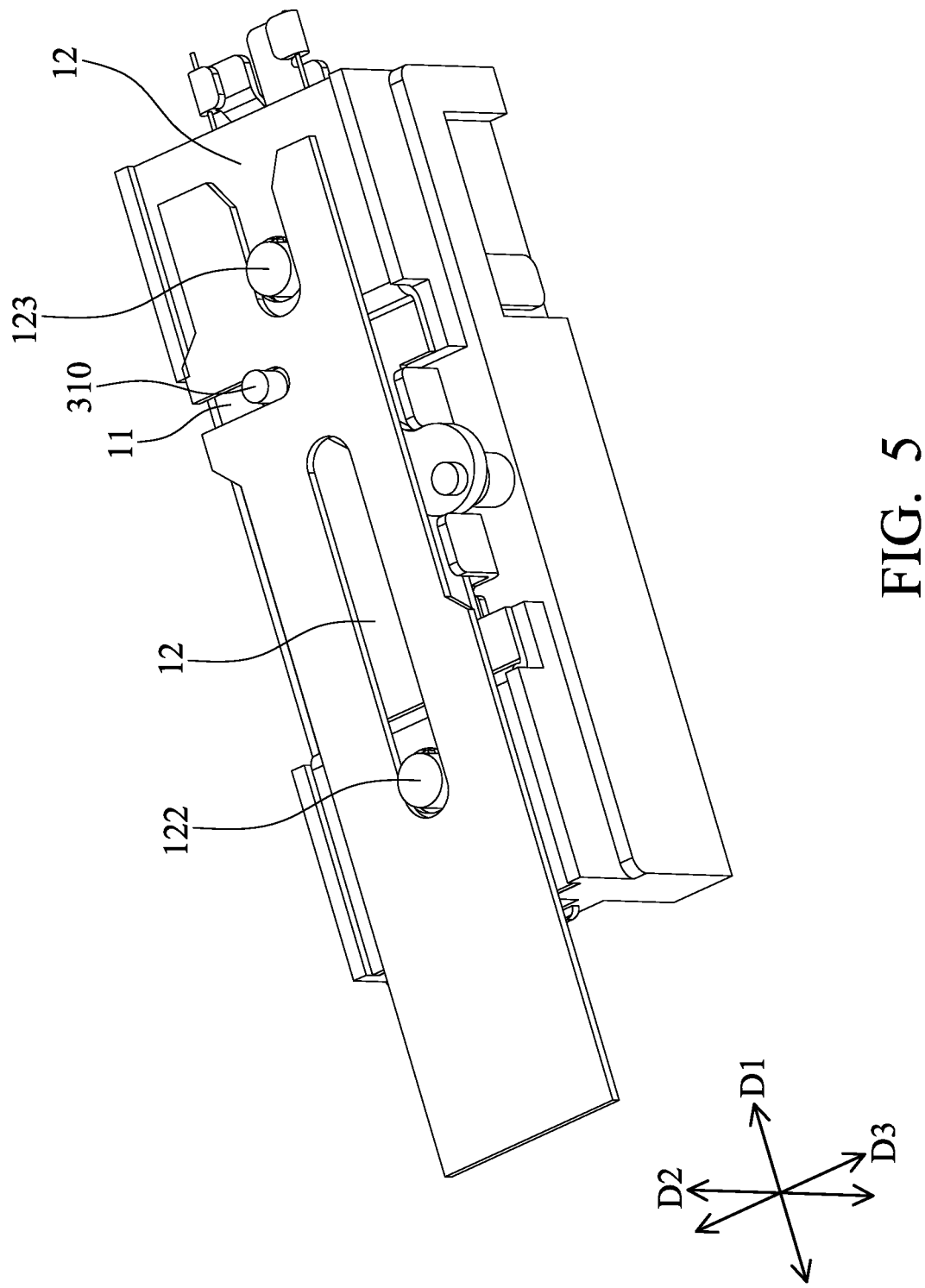
FIG. 5 is a schematic diagram showing a partial structure of an optical element driving mechanism according to an embodiment of the present disclosure.

Refer to FIG. 1 to FIG. 5. FIG. 1 is a perspective view of an optical element driving mechanism 1 according to an embodiment of the present disclosure. FIG. 2 is an exploded view showing an optical element driving mechanism 1 according to an embodiment of the present disclosure. FIG. 3 to FIG. 5 are perspective views showing a partial structure of an optical element driving mechanism 1 according to an embodiment of the present disclosure. It should be noted that in FIG. 3 to FIG. 5, different components are omitted to clearly show the arrangement of components in the optical element driving mechanism 1.

The optical element driving mechanism 1 includes an optical element 10, a fixed portion 100, a first movable portion 200, a second movable portion 300, a driving assembly 400, a circuit assembly 500, and a fixing assembly 600.

The optical element 10 is a substantially rectangular plate-shaped structure, and has an accommodating portion 11 and two hole portions 12. The accommodating portion 11 accommodates a part of the second movable portion 300, and the two hole portions accommodate a part of the fixed portion 100. The optical element 10 may be moved along a first direction D1 as the first movable portion 200 moves, and the first direction D1 is parallel to a long side of the rectangular plate-shaped structure. When viewed along a second direction D2 that is perpendicular to the plate-shaped structure (and the first direction D1), the accommodating portion 11 extends along a third direction D3, and the third direction D3 is perpendicular to the first direction D1 and the second direction D2. The two hole portions 12 extend along the first direction D1. When the optical element 10 is driven, an incident light may be shielded from or allowed entering an optical module (not shown).

The fixed portion 100 includes an outer cover 110, a base 120, and a spacer element 130. The outer cover 110 has an opening 111 corresponding to the optical module. The optical module may be disposed below the opening 111 and adjacent to the base 120. The opening 111 is perpendicular to the second direction D2. The incident light may enter the optical module through the opening 111, and the incident light may be blocked by driving the optical element 10 to shield the opening 111.

When viewed along the second direction D2, the outer cover 110 is a rectangle, and a long side of the rectangle extends along the first direction D1, and a short side of the rectangle extends along the third direction D3. The opening 111 and the second movable portion 300 are arranged along the first direction D1.

The base 120 is combined with the outer cover 110 along the second direction D2 to form a casing for protecting internal components. The base 120 has a rotating shaft 121, a first positioning structure 122, a second positioning structure 123, and a supporting portion 124. The rotating shaft 121 extends from the base 120 along the second direction D2. When viewed along the second direction D2, the rotating shaft 121 does not pass through the center of the rectangle. More specifically, the rotating shaft 121 is disposed close to one of the two long sides of the rectangle.

The first positioning structure 122 and the second positioning structure 123 extend from the base 120 to the optical element 10 along the second direction D2, and the first positioning structure 122 and the second positioning structure 123 are arranged along the first direction D1. As shown in FIG. 4, the first positioning structure 122 and the second positioning structure 123 are configured to position the spacing element 130. In addition, as shown in FIG. 3, the first positioning structure 122 and the second positioning structure 123 may guide a movement of the first movable portion 200. And as shown in FIG. 5, the first positioning structure 122 and the second positioning structure 123 pass through the hole portions 12 of the optical element 10 and guide a movement of the optical element 10.

As shown in FIG. 2 to FIG. 4, the supporting portion 124 is disposed on two sidewalls of the base 120. More specifically, the two sidewalls of the base 120 are inwardly and downwardly recessed to form a step, which is the supporting portion 124. The spacer element 130 may be disposed on the supporting portion 124, and by applying an adhesive element (eg, adhesive, etc.) on the supporting portion 124, the spacer element 130 may be fixedly connected to the base 120 of the fixed portion 100 through the adhesive element.

The spacer element 130 is disposed between the optical element 10 and the driving assembly 400. The spacer element 130 is a plate-shaped structure, which has a flat portion 131 and a recessed portion 132. The recessed portion 132 is formed by recessed from the flat portion 131 along the second direction D2 away from the optical element 10.

The spacer element 130 is configured to support the optical element 10, and may include a metal material. More specifically, the optical element 10 is disposed on the flat portion 131 of the spacer element 130, and the spacer element 130 may guide the movement of the optical element 10. The spacer element 130 may be made of a metal material, so that the optical element 10 is less likely to be damaged due to friction when the optical element 10 moves.

When viewed along the second direction D2, the recessed portion 132 and the opening 111 are arranged along the first direction D1. The recessed portion 132 may accommodate and support the second movable portion 300, so that the second movable portion 300 may move on the recessed portion 132. As described above, since the recessed portion 132 is made of metal, so that the second movable portion 300 less likely to be damaged due to friction when the second movable portion 300 moves.

Further, through the design of the recessed portion 132, the space inside the optical element driving mechanism 1 may be fully utilized, thereby achieving overall thinning. As described above, the adhesive element may be disposed on the supporting portion 124 to connect to the flat portion 131, and the element may also be disposed on the base 120 adjacent to the recessed portion 132, so that the recessed portion 132 may also be fixedly connected to the base 120.

As shown in FIG. 2 and FIG. 3, the first movable portion 200 is a plate-shaped structure that is perpendicular to the second direction D2. The first movable portion 200 may include a metal material. The first movable portion 200 is disposed between a bottom surface of the base 120 and the spacing element 130, and may move relative to the fixed portion 100 in a first dimension. The first movable portion 200 has a first hole 201, a second hole 202, a plurality of protruding portions 203, at least one hollowed portion 204, and a first linkage portion 210.

The first positioning structure 122 and the second positioning structure 123 pass through the first hole 201 and the second hole 202 respectively. A length of any one of the first hole 201 and the second hole 202 along the first direction D1 is longer than a length along the third direction D3. The length of any one of the first hole 201 and the second hole 202 along the first direction D1 is longer than diameters of the first positioning structure 122 and the second positioning structure 123. The length of any one of the first hole 201 and the second hole 202 along the third direction D3 are approximately equal to the diameters of the first positioning structure 122 and the second positioning structure 123. By this configuration, a movement range of the first movable portion 200 in the first direction D1 is limited, and a motion in the first dimension is a movement along the first direction D1.

The first linkage portion 210 has two engaging structures 211, 212, and the two engaging structures 211, 212 protrude toward the optical element 10 from the plate-shaped structure along the second direction D2. The first movable portion 200 drives the second movable portion 300 to move via the first linkage portion 210.

As shown in FIG. 4, the second movable portion 300 is roughly rod-shaped, may include a plastic material, and has a first end portion 301 and a second end portion 302. The first end portion 301 has an arc shape, is disposed between the two engaging structures 211, 212, and is engaged between the two engaging structures 211, 212. The first end portion 301 has a hole H through which the rotating shaft 121 of the base 120 passes. When viewed along the second direction D2, the rotating shaft 121 is disposed closer to one of the two engaging structures 211, 212.

The second end portion 302 is a free end, and is provided with a second linkage portion 310. The second linkage portion 310 is a cylindrical structure extending along the second direction D2. As shown in FIG. 5, the second linkage portion 310 is engaged with the accommodating portion 11 of the optical element 10. When viewed along the second direction D2, the first linkage portion 210 and the second linkage portion 310 are respectively located on two sides of the center of the rectangle. When viewed along the second direction D2, the rotating shaft 121 and the second linkage portion 310 are respectively located on two sides of the center of the rectangle.

The second movable portion 300 may move relative to the fixed portion 100 and the first movable portion 200. More specifically, the second movable portion 300 may move relative to the fixed portion 100 in a second dimension, and the second dimension is different from the first dimension. In this embodiment, a motion in the second dimension is a rotation around the rotating shaft 121.

The second movable portion 300 may drive the optical element 10 to move via the second linkage portion 310, and the second movable portion 300 may drive the optical element 10 to move in a third dimension. The third dimension is different from the second dimension. In this embodiment, a motion in the third dimension is a movement along a first direction.

As shown in FIG. 2 and FIG. 3, the driving assembly 400 drives the first movable portion 200 to move relative to the fixed portion 100, and includes a first driving element 410 and a second driving element 420. The first driving element 410 and the second driving element 420 are elongated structures, and include shape memory alloys (Shape Memory Alloys, SMA). The first driving element 410 is parallel to the second driving element 420. The first driving element 410 and the second driving element 420 extend along the first direction D1.

The first driving element 410 has a first electrical contact 411 and a second electrical contact 412. The first electrical contact 411 is fixedly connected to the fixed portion 100, and the second electrical contact 412 is fixedly connected to the first movable portion 200. The second driving element 420 has a third electrical contact 421 and a fourth electrical contact 422. The third electrical contact 421 is fixedly connected to the fixed portion 100, and the fourth electrical contact 422 is fixedly connected to the first movable portion 200. When viewed along the second direction D2, the first electrical contact 411 and the fourth electrical contact 422 are located on the same side of the fixed portion 100. When viewed along the second direction D2, the first electrical contact 411 and the third electrical contact 421 are respectively located on different two sides of the fixed portion 100.

Figure 6A:
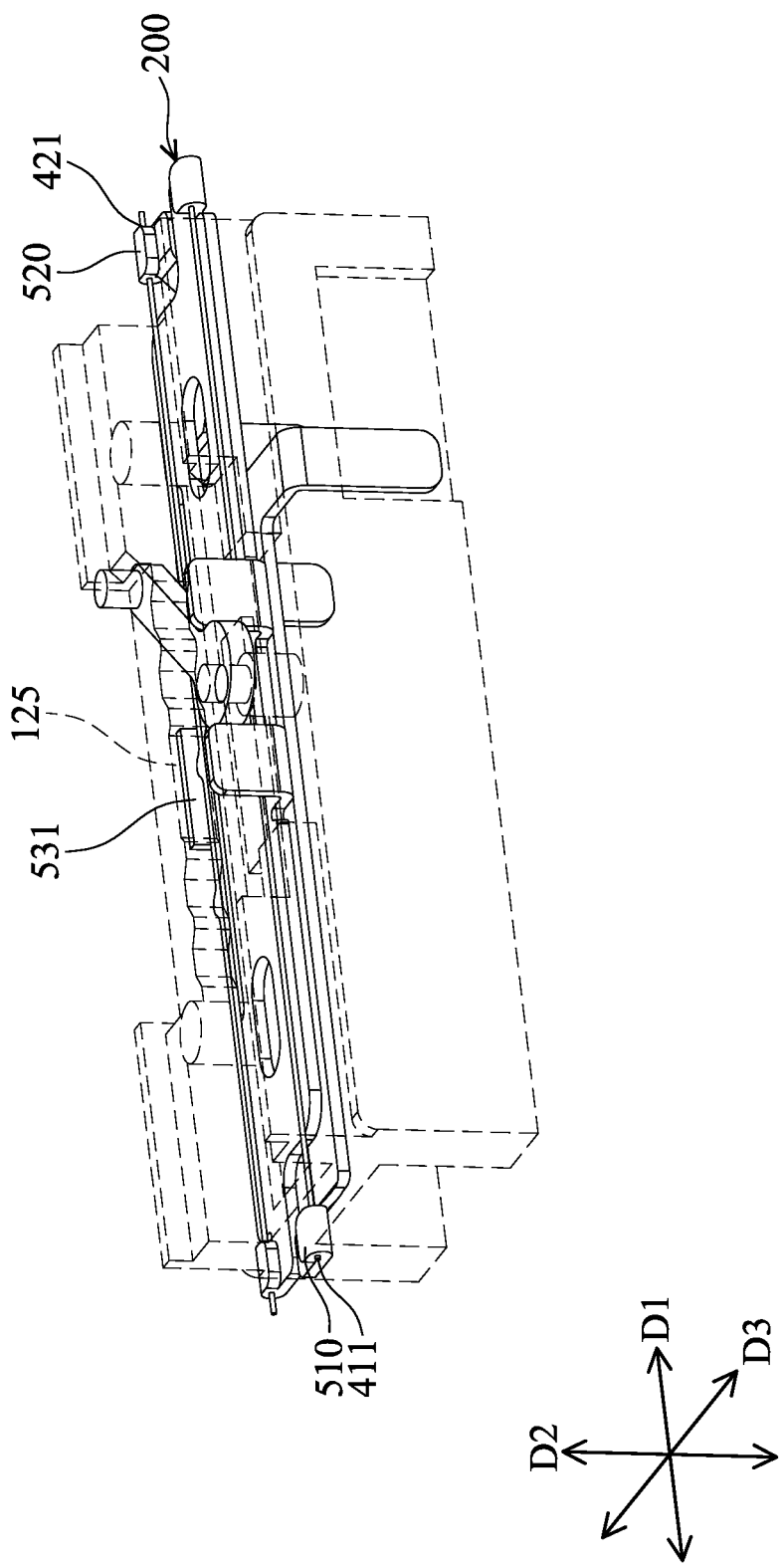
FIG. 6A is a schematic diagram showing a partial structure of an optical element driving mechanism according to an embodiment of the present disclosure.
Figure 6B:
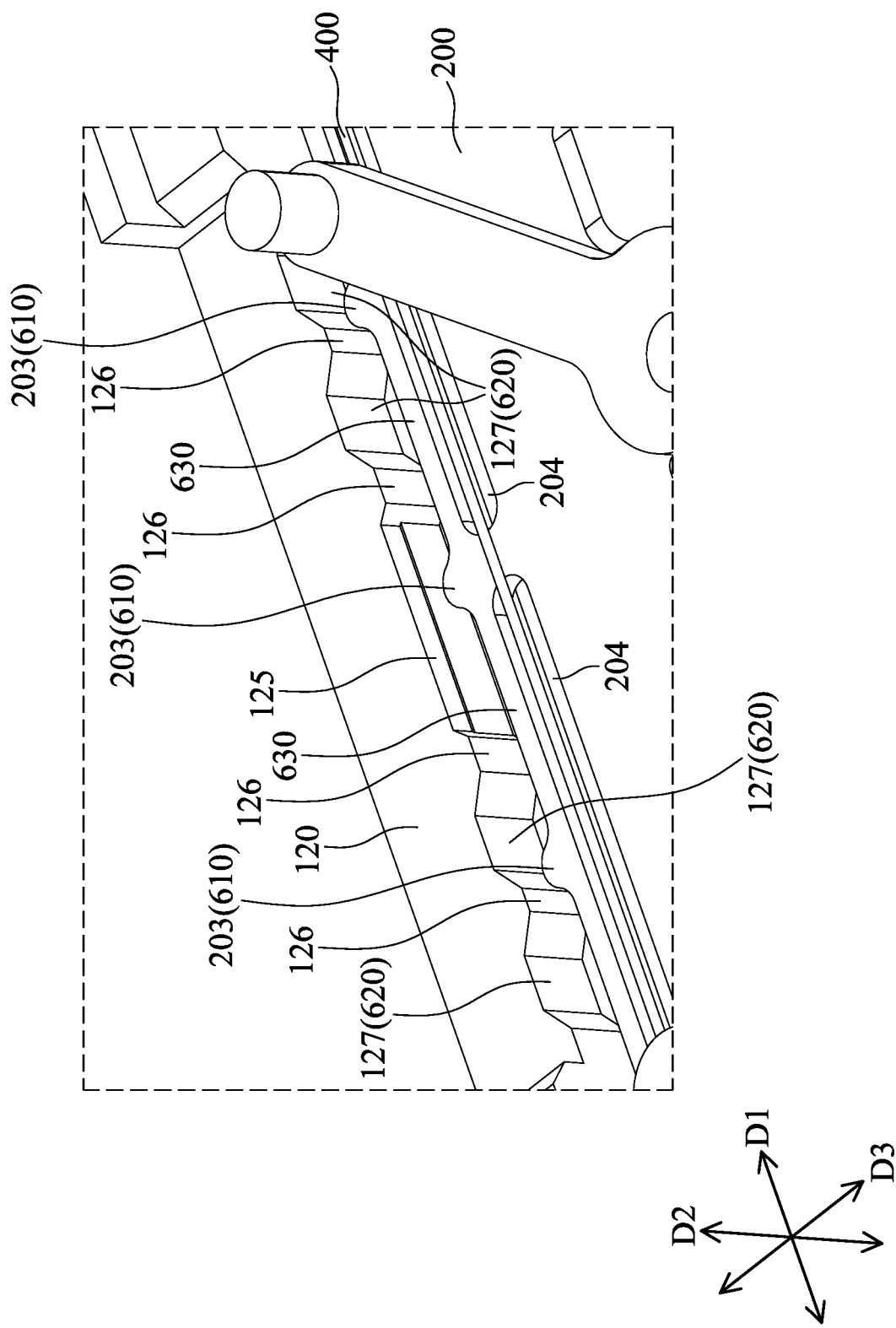
FIG. 6B is an enlarged schematic diagram showing a partial structure of an optical element driving mechanism according to an embodiment of the present disclosure.
Figure 7:
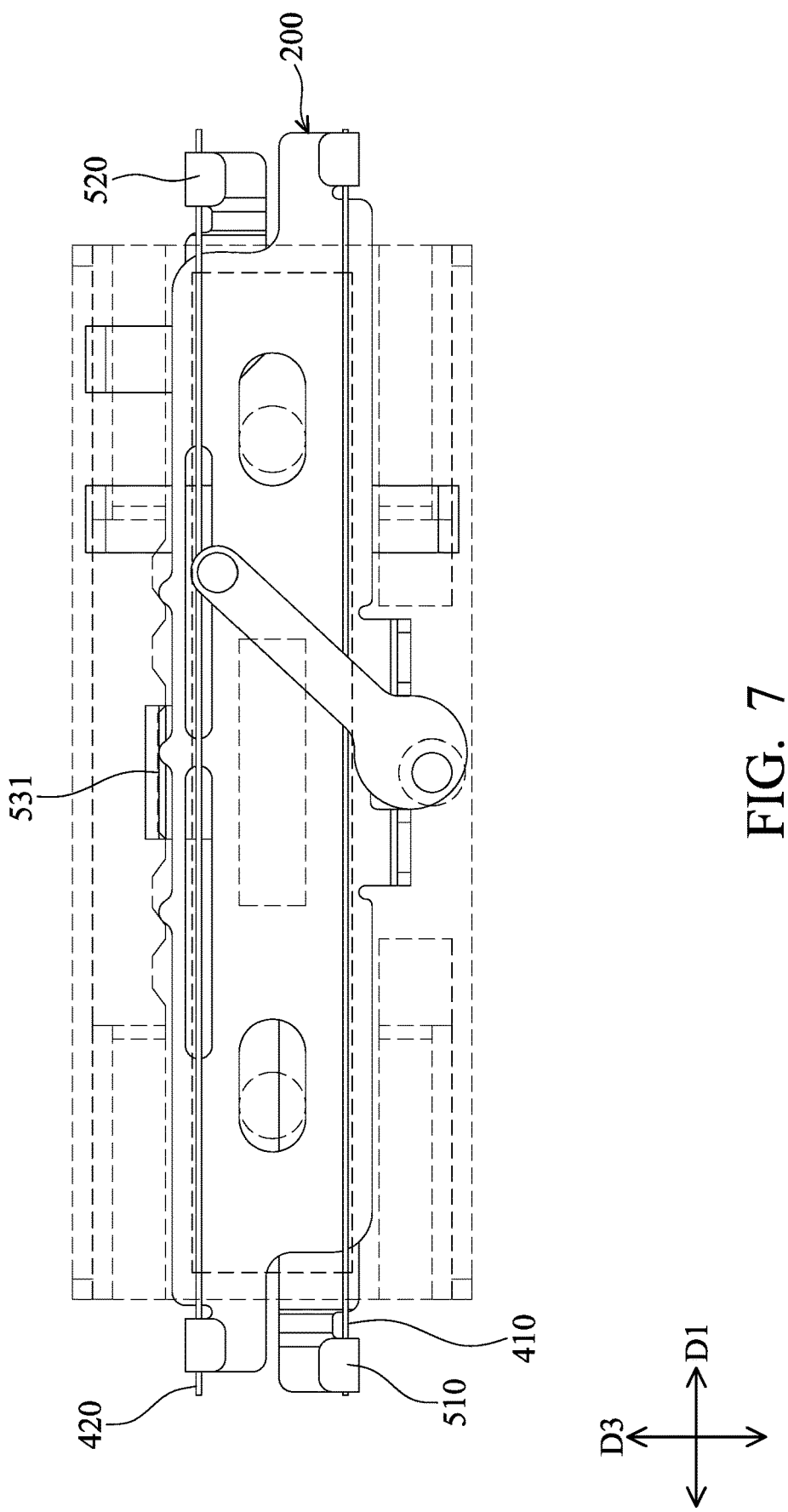
FIG. 7 is a top view showing a partial structure of an optical element driving mechanism according to an embodiment of the present disclosure.

Refer to FIG. 2, FIG. 3, FIG. 6A to FIG. 8. FIG. 6A is a schematic diagram showing a partial structure of the optical element driving mechanism 1 according to an embodiment of the present disclosure, and FIG. 6B is an enlarged schematic diagram showing a partial structure of the optical element driving mechanism 1 according to an embodiment of the present disclosure. FIG. 7 is a top view showing a partial structure of the optical element driving mechanism 1 according to an embodiment of the present disclosure. FIG. 8 is a bottom view showing a partial structure of the optical element driving mechanism 1 according to an embodiment of the present disclosure. It should be noted that in FIG. 6A, dotted lines indicate transparency to clearly illustrate the configuration of each component.

The circuit assembly 500 is embedded in the base 120, and includes a first circuit component 510, a second circuit component 520, and a third circuit component 530. One end of the first circuit component 510 is connected to an external circuit (not shown), and the other end is connected to the first electrical contact 411. One end of the second circuit component 520 is connected to the external circuit, and the other end is connected to the third electrical contact 421. One end of the third circuit component 530 is grounded, and the other end is an electrical end portion 531 exposed from the base 120. The electrical end portion 531 is disposed on an inner sidewall 125 of the base 120, and the inner sidewall 125 is perpendicular to the third direction D3.

Since the first movable portion 200 includes a metal material, the driving assembly 400 may be electrically connected to an external circuit via the first movable portion 200, and the first driving element 410 may be electrically connected to the second driving element 420 via the first movable portion 200. On the other hand, one of the plurality of protruding portions 203 protruding along the third direction D3 of the first movable portion 200 is in contact with the electrical end portion 531 of the third circuit component 530, thereby forming a ground loop.

As shown in FIG. 2 and FIG. 6B, the fixing assembly 600 includes a first fixing element 610, a second fixing element 620, and an elastic portion 630. When the driving assembly 400 is not actuated, the fixing assembly 600 may keep the first movable portion 200 fixed. The first fixing element 610 is disposed on the first movable portion 200, has a protruding structure, and includes a metal material. The first fixing element 610 is connected to the first movable portion 200 via the elastic portion 630, and may be integrally formed with the first movable portion 200. In some embodiments, the plurality of protruding portions 203 of the first movable portion 200 protruding along the third direction D3 and arranged along the first direction D1 may be used as the first fixing element 610.

The second fixing element 620 is disposed on the fixed portion 100. The second fixing element 620 has a concave structure and includes a plastic material. In some embodiments, as shown in FIG. 6B, a plurality of protruding structures 126 are provided on the inner sidewall 125 of the base 120, and a plurality of concave structures 127 formed between the plurality of protruding structures 126 may be used as the second fixing element 620, so as to accommodate the plurality of protruding portions 203 used as the first fixing elements 610.

The elastic portion 630 is flexible and may be connected to the first fixing element 610 or the second fixing element 620. In some embodiments, as shown in FIG. 6B, at least one hollowed portion 204 is disposed adjacent to a plurality of the protruding portion 203, and a portion between the hollowed portion 204 and the protruding portion 203 may be used as the elastic portion 630.

However, the structures of the first fixing element 610, the second fixing element 620, and the elastic portion 630 are not limited to the embodiments described above, and may be changed according to requirements.

Next, operations of the optical element drive mechanism 1 will be described. When a current is passed through the first circuit component 510 or the second circuit component 520 from the external circuit, the driving assembly 400 having a shape memory alloy will be heated and contracted along the first direction D1 with the current is passed through, so the first movable portion 200 connected to the driving assembly 400 is moved in the first direction D1.

When the first movable portion 200 is moved along the first direction D1, the two engaging structures 211, 212 of the first linkage portion 210 are also moved along the first direction D1. Therefore, the first end portion 301 between the two engaging structures 211 and 212 is driven to rotate around the rotating shaft 121. Then, the second linkage portion 310 disposed on the second end portion part 302 also rotate around the rotating shaft 121. Thus, the optical element 10 engaged with the second linkage portion 310 is also moved in the first direction D1.

That is, by controlling the driving assembly 400, the first movable portion 200 may be driven to move, and then drive the second movable portion 300 and the optical element 10 to move, thereby controlling the amount of light entering the optical module.

Figure 9A:
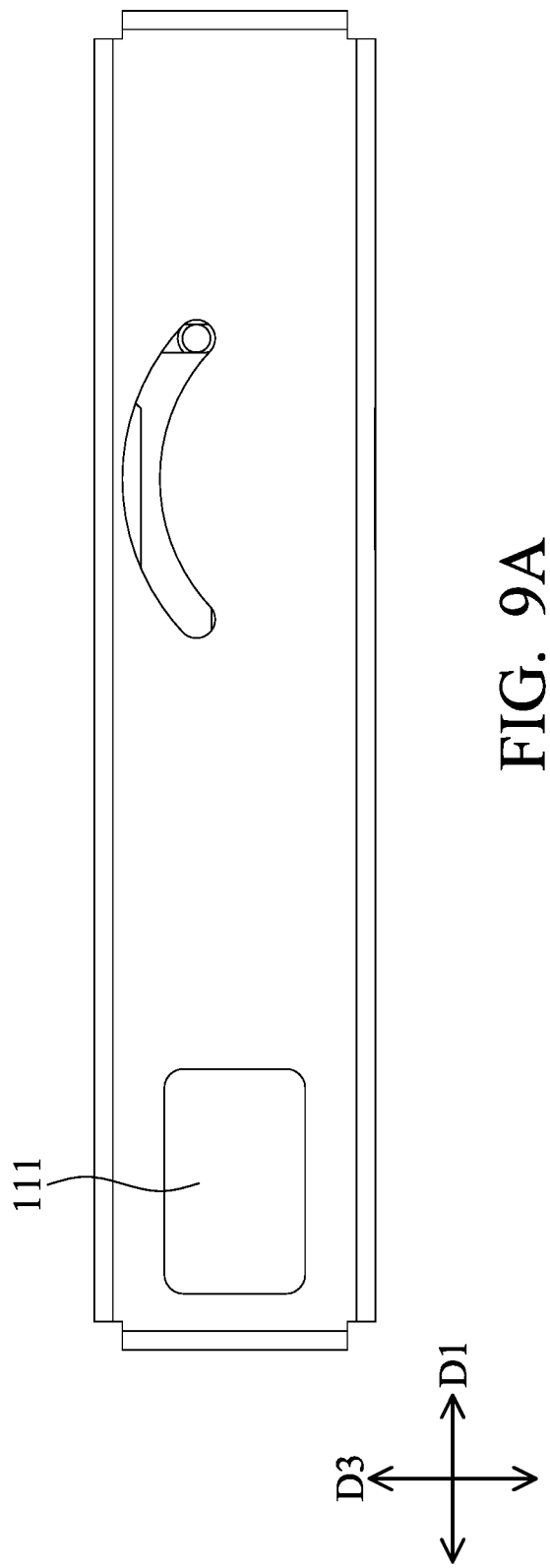
FIG. 9A and FIG. 9B are top views showing different operations of the optical element driving mechanism according to an embodiment of the present disclosure.
Figure 12B:
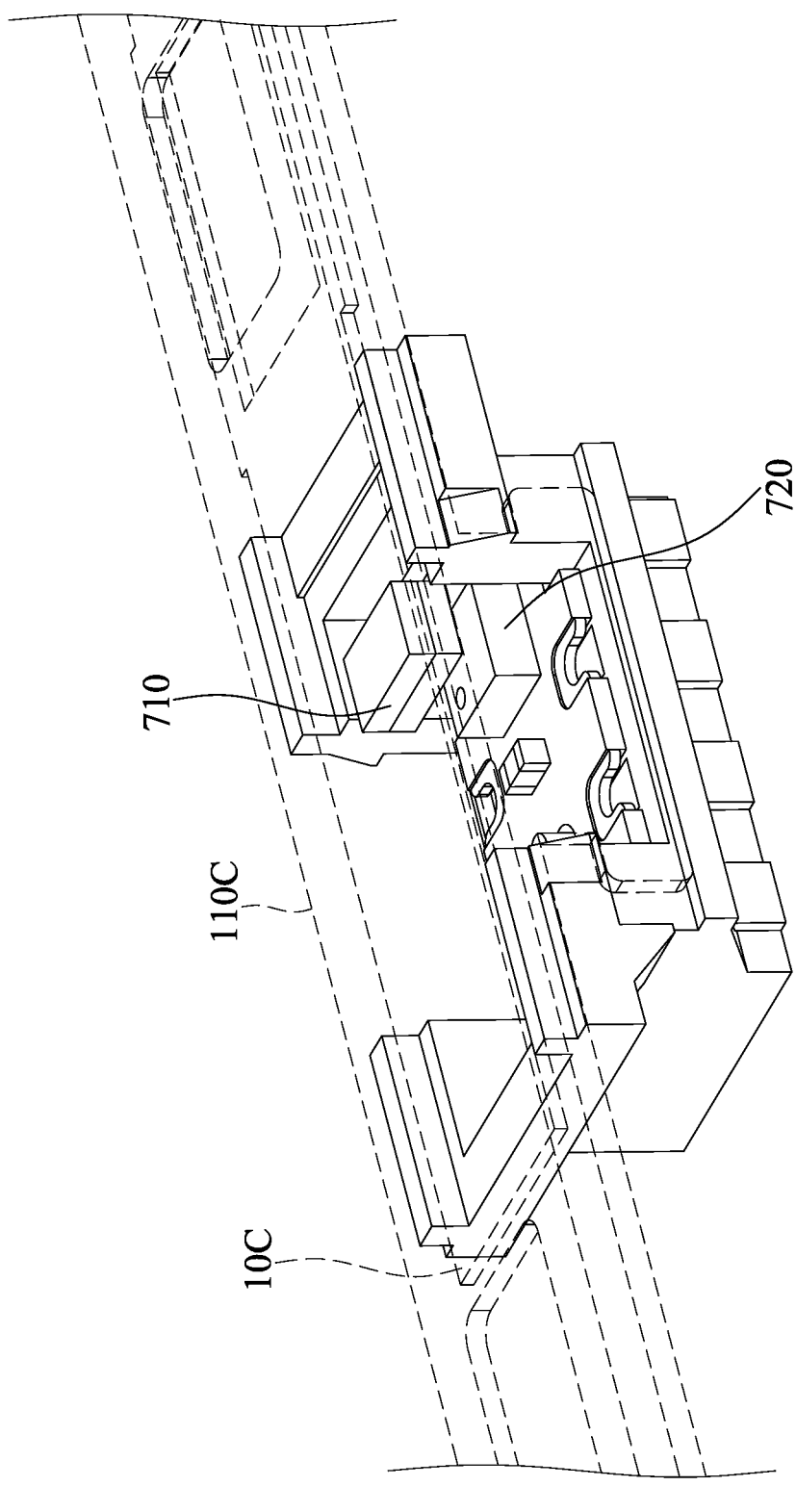
FIG. 12B is an enlarged schematic diagram showing a partial structure of an optical element driving mechanism according to another embodiment of the present disclosure.
Figure 13A:
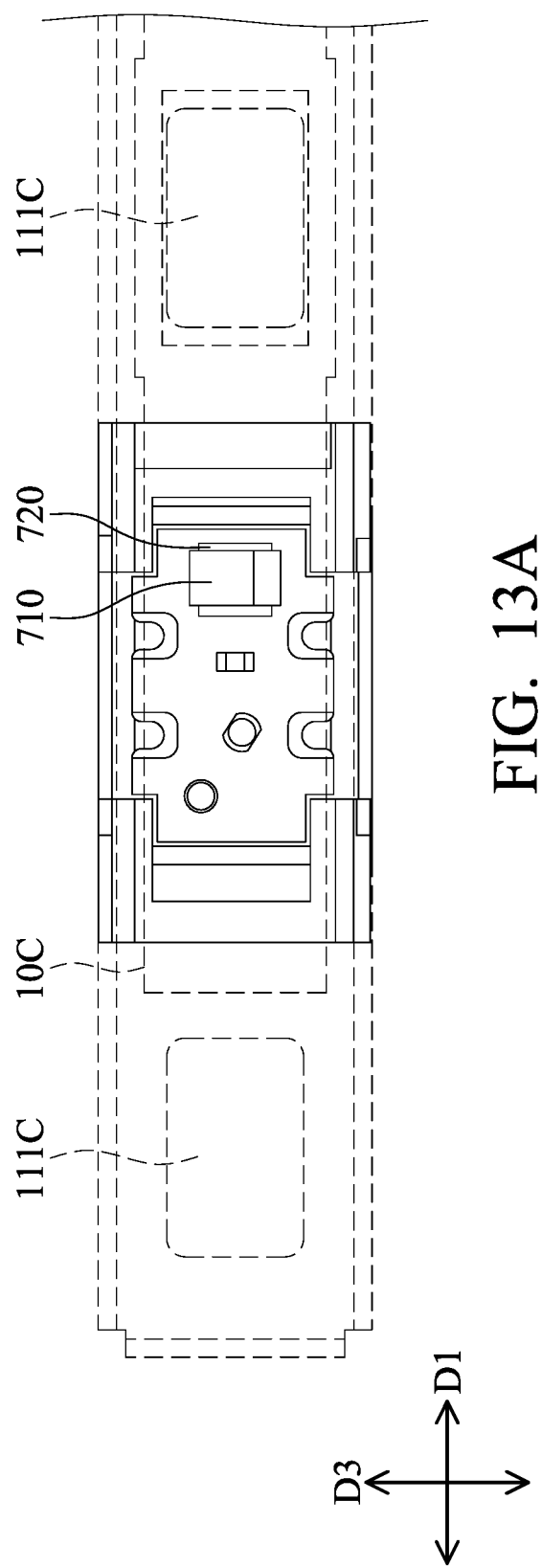
FIG. 13A and FIG. 13B are top views showing different operations of the optical element driving mechanism according to another embodiment of the present disclosure.
Figure 13B:
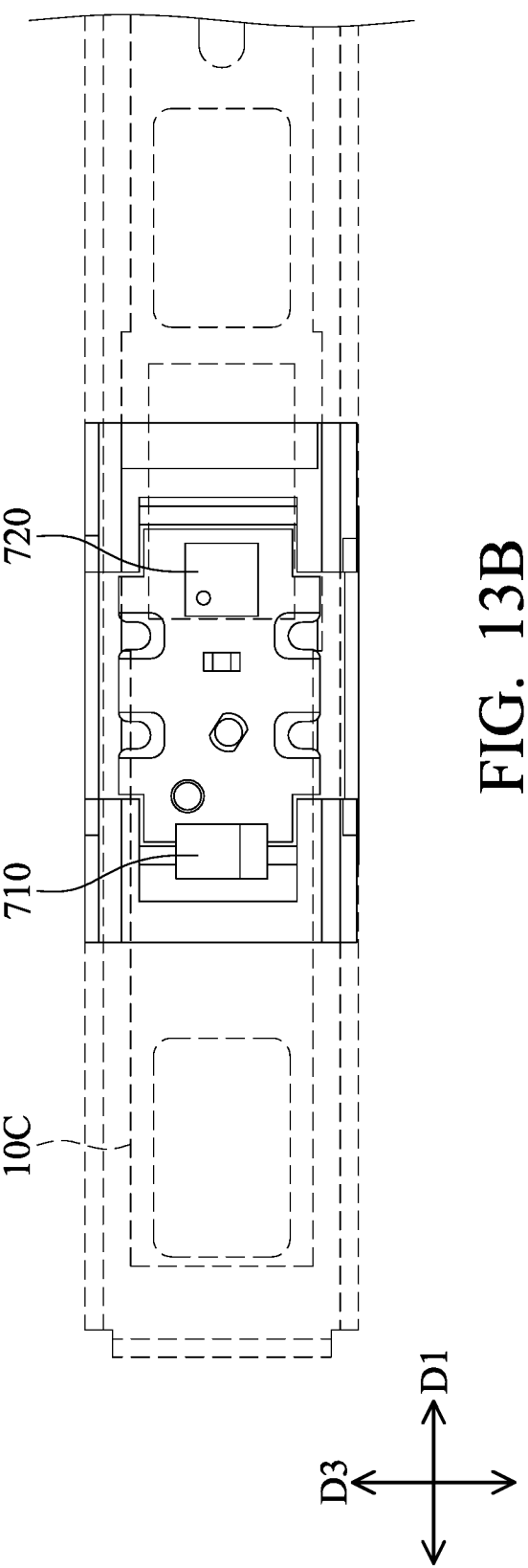

Refer to FIG. 1, FIG. 9A to FIG. 13B. FIG. 9A and FIG. 9B are top views showing different operations of the optical element driving mechanism 1 according to an embodiment of the present disclosure. FIG. 10A and FIG. 10B are top views showing different operations of the optical element driving mechanism 1 according to another embodiment of the present disclosure. FIG. 11A and FIG. 11B are top views showing different operations of the optical element driving mechanism 1 according to another embodiment of the present disclosure. FIG. 12A is a perspective view showing an optical element driving mechanism 1 according to another embodiment of the present disclosure, and FIG. 12B is an enlarged schematic diagram showing a partial structure of an optical element driving mechanism 1 according to another embodiment of the present disclosure. FIG. 13A and FIG. 13B are top views showing different operations of the optical element driving mechanism 1 according to another embodiment of the present disclosure.

Figure 9B:
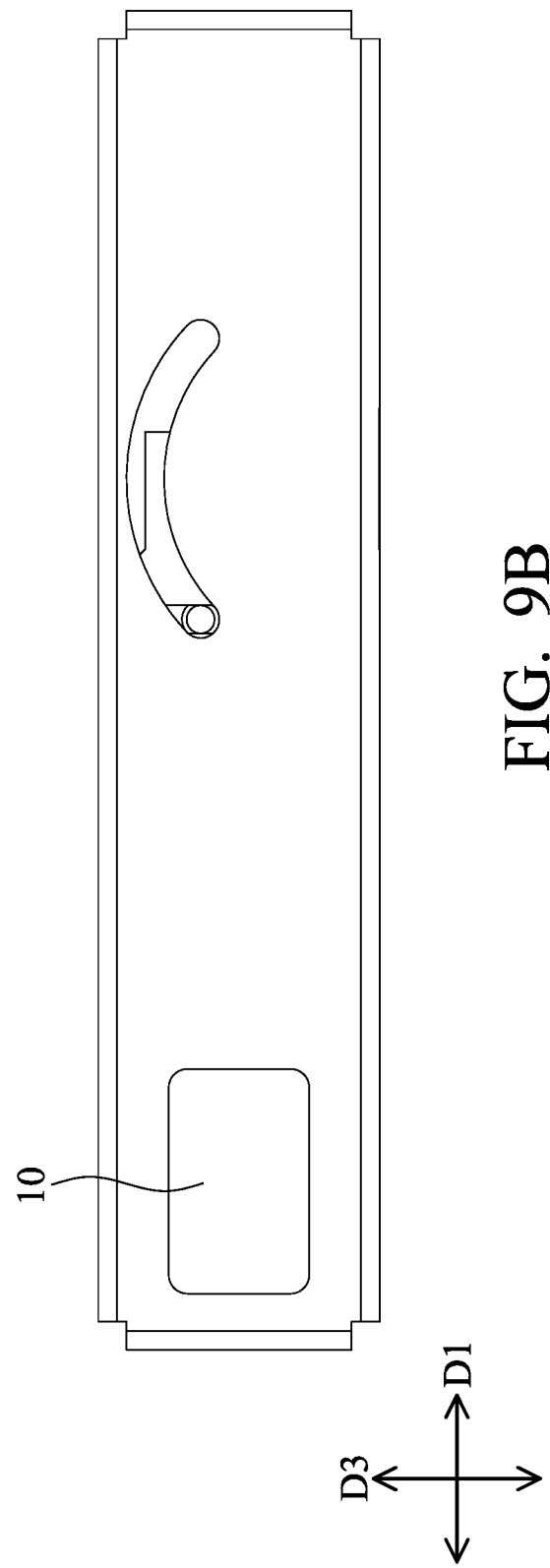
Figure 10A:
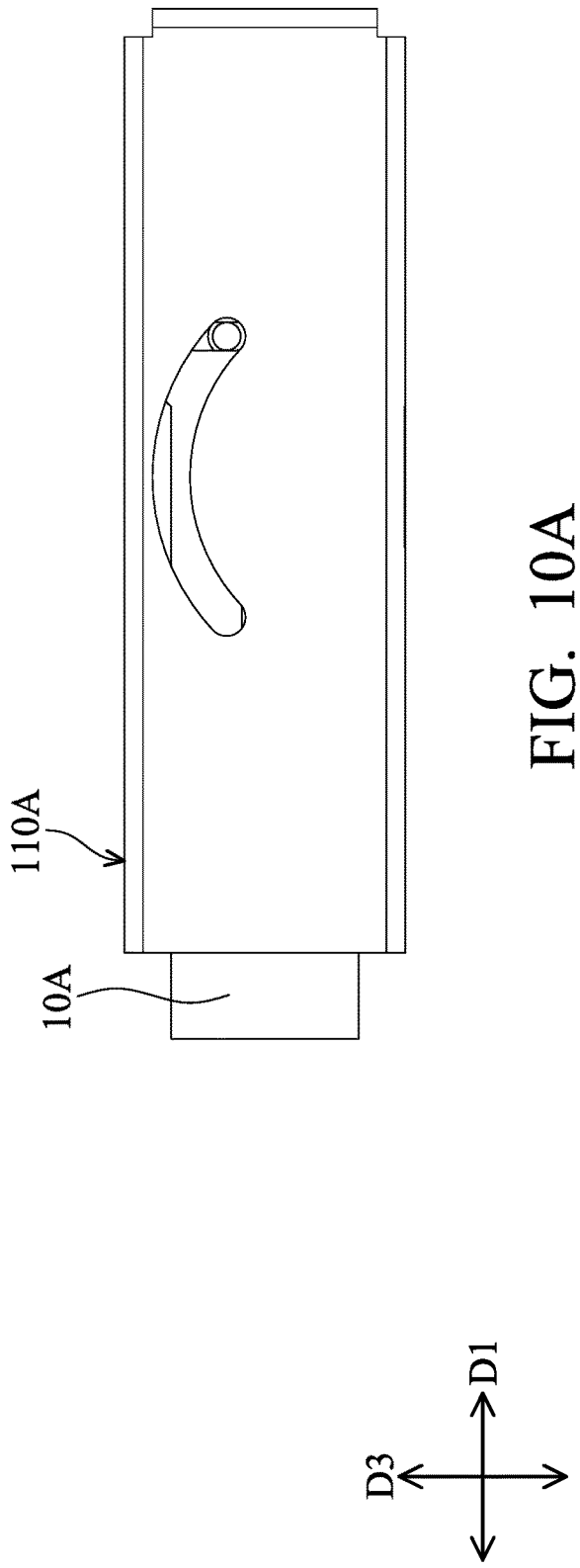
FIG. 10A and FIG. 10B are top views showing different operations of the optical element driving mechanism according to another embodiment of the present disclosure.
Figure 10B:
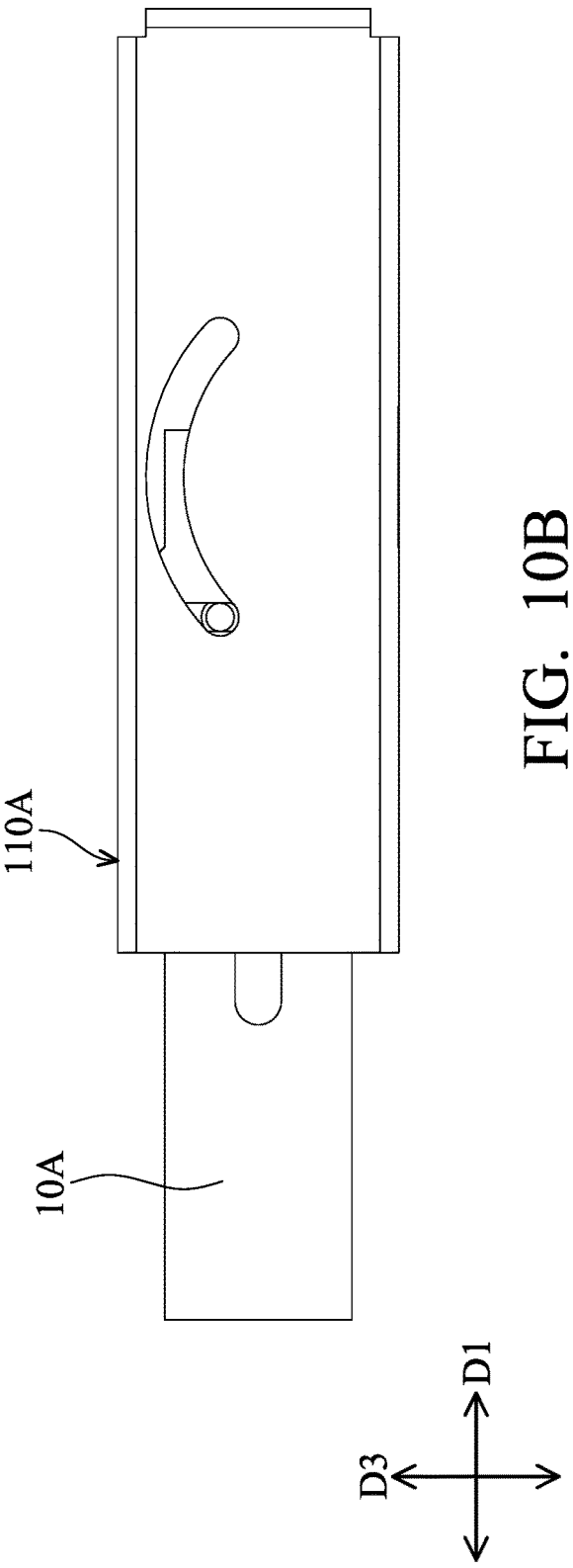

FIG. 9A and FIG. 9B respectively show schematic diagrams of the opening 111 being not shielded or shielded by the optical element 10. Although one opening 111 corresponding to the optical module is shown in the embodiments of FIG. 1, FIG. 9A, and FIG. 9B, it is not limited thereto. For example, as shown in FIG. 10A and FIG. 10B, in some embodiment, the outer cover 110A may not have the opening 111, and the incident light is directly shielded from entering the optical module by driving the optical element 10A.

In addition, in some embodiments, the outer cover may also have more than one opening to correspond to more than one optical module respectively. As shown in FIG. 11A and FIG. 11B, the outer cover 110B has two openings 111B, and the incident light may be shielded from entering two optical modules by only driving the one optical element 10B.

On the other hand, in some embodiments, as shown in FIG. 12A and FIG. 12B, a position sensing assembly 700 may be disposed between two optical modules. The position sensing assembly 700 includes a reference element 710 and a position sensing element 720, the reference element 710 is disposed on the optical element 10C, and the position sensing element 720 is disposed connected to the outer cover 110C of the fixed portion 100C. When viewed along the second direction D2, the position sensing element 720 and the base 120C do not overlap.

More specifically, the position sensing element 720 may be, for example, a Hall effect sensor, a magnetoresistive resistance sensor (MR sensor), or a Fluxgate, and the reference element 710 may be, for example, a magnetic element. With this configuration, the position sensing element 720 may sense a change of magnetic field of the reference element 710 on the optical element 10C.

Therefore, as shown in FIG. 13A and FIG. 13B, the position sensing element 720 may sense whether the optical element 10C is opening or closing the opening 111C by sensing the change of magnetic field of the reference element 720 moved along with the optical element 10C.

To sum up, the present disclosure provides an optical element driving mechanism, includes a fixed portion, a first movable portion, and a driving assembly. The driving assembly drives the first movable portion to move relative to the fixed portion, and further drives the optical element to move. Thereby, a more miniaturized optical element driving mechanism may be provided, which may be applied to control light quantity and is less susceptible to magnetic interference.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, driving an optical element, comprising:
a fixed portion;
a first movable portion, movable relative to the fixed portion;
a driving assembly, driving the first movable portion to move relative to the fixed portion,
wherein the first movable portion is moved in a first dimension relative to the fixed portion, and the first movable portion drives the optical element to move; and
a second movable portion, movable relative to the fixed portion and the first movable portion; wherein:
a motion in the first dimension comprises a movement along a first direction;
the second movable portion is moved in a second dimension relative to the fixed portion;
the second dimension is different from the first dimension;
the fixed portion comprises a base, and the base has a rotating shaft extending along a second direction, and the first direction is perpendicular to the second direction;
a motion in the second dimension comprises a rotation around the rotating shaft;
when viewed along the second direction, the fixed portion is a rectangle, and a long side of the rectangle extends along the first direction, and a short side of the rectangle extends along a third direction that is perpendicular to the first direction and the second direction; and
the first movable portion drives the second movable portion to move.

2. The optical element driving mechanism as claimed in claim 1, wherein:
the rotating shaft does not pass through a center of the rectangle;
the fixed portion has an opening corresponding to an optical module; and
the opening and the second movable portion are arranged along the first direction.

3. The optical element driving mechanism as claimed in claim 2, wherein:
the fixed portion further comprises a spacer element disposed between the optical element and the driving assembly;
the spacing element is a plate-shaped structure, the plate-shaped structure has a flat portion and a recessed portion, and the recessed portion is recessed from the flat portion away from the optical element along the second direction;
the spacer element is configured to support the optical element;
the optical element is disposed on the flat portion;
the spacer element guides a motion of the optical element; and
the recessed portion accommodates the second movable portion.

4. The optical element driving mechanism as claimed in claim 3, wherein:
the spacer element is fixedly connected to the base of the fixed portion via an adhesive element, and the adhesive element is adjacent to the recessed portion; and
the recessed portion and the opening are arranged along the first direction.

5. The optical element driving mechanism as claimed in claim 3, wherein:
the fixed portion further comprises a first positioning structure and a second positioning structure, disposed on the base and extending from the base to the optical element along the second direction, and the first positioning structure and the second positioning structure are arranged along the first direction;
the first positioning structure and the second positioning structure position the spacing element;
the first positioning structure and the second positioning structure guide a motion of the first movable portion;
the first movable portion has a first hole and a second hole, and the first positioning structure and the second positioning structure respectively pass through the first hole and the second hole;
a length of any one of the first hole and the second hole along the first direction is greater than a length along the third direction;

the first positioning structure guides the movement of the optical element; and the optical element further has a hole portion, and the first positioning structure passes through the hole portion.

6. The optical element driving mechanism as claimed in claim 1, wherein:

the first movable portion is a plate-shaped structure, and the plate-shaped structure is perpendicular to the second direction;

the first movable portion further has a first linkage portion, and the first linkage portion has two engaging structures, and the two engaging structures protrude from the plate-shaped structure toward the optical element along the second direction;

the first movable portion drives the second movable portion to move via the first linkage portion; and the second movable portion is disposed between the two engaging structures of the first linkage portion.

7. The optical element driving mechanism as claimed in claim 6, wherein:

the second movable portion has a first end portion and a second end portion, the first end portion is provided with a hole through which the rotating shaft passes, the second end portion is provided with a second linkage portion, and the second linkage portion is a cylindrical structure extending along the second direction;

the optical element has an accommodating portion, which accommodates the second linkage portion; and the second movable portion drives the optical element to move through the second linkage portion.

8. The optical element driving mechanism as claimed in claim 7, wherein:

when viewed along the second direction, the first linkage portion and the second linkage portion are respectively located on both sides of the center; and when viewed along the second direction, the rotating shaft and the second linkage portion are respectively located on two sides of the center of the rectangle.

9. The optical element driving mechanism as claimed in claim 7, wherein:

the second movable portion drives the optical element to move in a third dimension;

the third dimension is different from the second dimension; and a motion in the third dimension comprises a movement along the first direction.

10. The optical element driving mechanism as claimed in claim 6, wherein when viewed along the second direction, the rotating shaft is disposed closer to one of the two engaging structures.

11. The optical element driving mechanism as claimed in claim 1, wherein:

the driving assembly comprises a first driving element and a second driving element;

the first driving element is an elongated structure extending along the first direction;

the second driving element is an elongated structure parallel to the first driving element and extending along the first direction;

the first driving element and the second driving element comprises a shape memory alloy;

the first driving element has a first electrical contact and a second electrical contact;

the first electrical contact is fixedly connected to the fixed portion;

the second electrical contact is fixedly connected to the first movable portion;

the second driving element has a third electrical contact and a fourth electrical contact;

the third electrical contact is fixedly connected to the fixed portion;

the fourth electrical contact is fixedly connected to the first movable portion;

when viewed along the second direction, the first electrical contact and the fourth electrical contact are located on the same side of the fixed portion; and when viewed along the second direction, the first electrical contact and the third electrical contact are respectively located on different two sides of the fixed portion.

12. The optical element driving mechanism as claimed in claim 11, wherein:

the driving assembly is electrically connected to an external circuit via the first movable portion;

the first driving element is electrically connected to the second driving element via the first movable portion; and the first movable portion comprises a metal material.

13. The optical element driving mechanism as claimed in claim 12, wherein:

a first circuit component, a second circuit component, and a third circuit component are embedded in the base;

one end of the first circuit component is connected to the external circuit, and the other end is connected to the first electrical contact;

one end of the second circuit component is connected to the external circuit, and the other end is connected to the third electrical contact; and one end of the third circuit component is grounded, and the other end is an electrical end portion exposed from the base, and the electrical end portion is disposed on an inner sidewall of the base, and the inner sidewall is perpendicular to the third direction.

14. The optical element driving mechanism as claimed in claim 13, wherein:

the first movable portion further has a plurality of protruding portions protruding along the third direction, and the plurality of protruding portions are arranged along the first direction; and one of the plurality of protruding portions is in contact with the electrical end portion of the third circuit component.

15. The optical element driving mechanism as claimed in claim 14, wherein the inner sidewall is provided with a plurality of protruding structures, and a plurality of concave structures formed between the plurality of protruding structures accommodate the plurality of protruding portions respectively.

16. The optical element driving mechanism as claimed in claim 15, wherein:

the first movable portion further has at least one hollowed portion, and the at least one hollowed portion is disposed adjacent to the plurality of protruding portions; and the second movable portion comprises a plastic material.

17. The optical element driving mechanism as claimed in claim 1, further comprises a fixing assembly, which keeps the first movable portion fixed when the driving assembly is not actuated wherein:

the fixing assembly comprises a first fixing element and a second fixing element, which are respectively disposed on the first movable portion and the fixed portion;

the fixing assembly further comprises an elastic portion, which is flexible and connected to the first fixing element or the second fixing element;
the first fixing element has a protruding structure;
the second fixing element has a concave structure;
the first fixing element comprises a metal material;
the first fixing element is integrally formed with the first movable portion;
the first fixing element is connected to the first movable portion via the elastic portion; and
the second fixing element comprises a plastic material.

18. The optical element driving mechanism as claimed in claim 1, further comprises a position sensing assembly, comprising:
a reference element, disposed on the optical element; and
a position sensing element, disposed and connected to the fixed portion,
wherein when viewed along the second direction, the position sensing element does not overlap with the base.

19. The optical element driving mechanism as claimed in claim 1, wherein the fixed portion further has more than one opening corresponding to more than one optical module respectively.

* * * * *